US008749913B2

(12) United States Patent
Plutt et al.

(10) Patent No.: US 8,749,913 B2
(45) Date of Patent: Jun. 10, 2014

(54) STAGED STORAGE MAGAZINE INSTALL IN A STORAGE LIBRARY

(75) Inventors: Daniel James Plutt, Superior, CO (US); Matthew David Woodbury, Westminster, CO (US); Blake Jonathan Mynatt, Broomfield, CO (US)

(73) Assignee: Oracle International Corporation, Redwood City, CA (US)

( * ) Notice: Subject to any disclaimer, the term of this patent is extended or adjusted under 35 U.S.C. 154(b) by 3 days.

(21) Appl. No.: 13/473,373

(22) Filed: May 16, 2012

(65) Prior Publication Data

US 2013/0306579 A1 Nov. 21, 2013

(51) Int. Cl.
*G11B 15/68* (2006.01)

(52) U.S. Cl.
USPC ............... 360/92.1; 369/30.42; 369/30.63; 369/30.68

(58) Field of Classification Search
USPC ............. 360/91, 92.1, 98.04, 98.05, 98.06; 369/30.4, 30.41, 30.42, 30.49, 30.63, 369/30.66, 30.67, 30.68
See application file for complete search history.

(56) References Cited

U.S. PATENT DOCUMENTS

| | | | |
|---|---|---|---|
| 7,292,405 B2 * | 11/2007 | Brace et al. | 360/92.1 |
| 7,768,739 B2 * | 8/2010 | Starr et al. | 360/92.1 |
| 7,782,565 B2 * | 8/2010 | Starr | 360/92.1 |
| 7,916,423 B2 * | 3/2011 | Starr et al. | 360/92.1 |
| 8,213,108 B2 * | 7/2012 | Noguchi et al. | 360/92.1 |
| 2002/0131197 A1 * | 9/2002 | Yoshida et al. | 360/92 |
| 2004/0017633 A1 * | 1/2004 | Oohara et al. | 360/92 |
| 2006/0091767 A1 * | 5/2006 | Chaloner et al. | 312/223.2 |
| 2008/0062558 A1 * | 3/2008 | McIntosh et al. | 360/90 |
| 2010/0027159 A1 * | 2/2010 | Pollard et al. | 360/92.1 |

* cited by examiner

*Primary Examiner* — Jefferson Evans
(74) *Attorney, Agent, or Firm* — Marsh Fischmann & Breyfogle LLP; Daniel J. Sherwinter

(57) ABSTRACT

Embodiments of the invention include systems and methods for facilitating relatively simple installation and/or removal of magazines in context of modules of a data storage system. For example, it may be desirable to fill a magazine with data storage cartridges and to install the full magazine into the data storage system. Embodiments use staged structural features to sequentially guide and align the magazine into a desired position in a data storage system. The structural features are designed to facilitate relatively simple installation while providing sufficiently accurate and secure positioning.

20 Claims, 8 Drawing Sheets

STAGED STORAGE MAGAZINE INSTALL IN A STORAGE LIBRARY

FIELD

Embodiments relate generally to data storage systems, and, more particularly, to cartridge magazines for use in storage libraries.

BACKGROUND

Storage library systems are often used by enterprises and the like to efficiently store and retrieve data from storage media. In the case of some storage libraries, the media are data cartridges (e.g., tape cartridges) that are typically stored and indexed within a set of magazines. When particular data is requested, a specialized robotic mechanism finds the appropriate cartridge, removes the cartridge from its magazine, and carries the cartridge to a drive that is designed to receive the cartridge and read its contents. Some storage libraries have multiple drives that can operate concurrently to perform input/output (IO) operations on multiple cartridges.

Ensuring proper functioning of the storage library involves secure and accurate positioning of components, including magazines. To maintain secure and accurate positioning, traditional data storage systems are typically designed to discourage interactions with those components, except by trained support personnel. For example, installation and/or removal of magazines may involve specialized tooling, coupling with relatively complex drawer railing mechanisms, etc.

BRIEF SUMMARY

Among other things, systems and methods are described to facilitate relatively simple installation and/or removal of magazines in context of modules of a data storage system. For example, it may be desirable to fill a magazine with data storage cartridges and to install the full magazine into the data storage system. Embodiments use staged structural features to sequentially guide and align the magazine into a desired position in a data storage system. The structural features are designed to facilitate relatively simple installation while providing sufficiently accurate and secure positioning.

According to one set of embodiments, a storage system is provided. The system includes a magazine configured to hold cartridges in slots and to be installed in a module by slideably engaging magazine engagement structure of the magazine with module engagement structure of the module in an installation dimension. The magazine engagement structure includes: a first portion of the magazine engagement structure engageable to interface with the module engagement structure while permitting a first degree of motion in a first dimension and a second degree of motion in a second dimension, wherein the first dimension, the second dimension, and the installation dimension are different dimensions; a second portion of the magazine engagement structure engageable to interface with the module engagement structure while permitting only a third degree of motion in the first dimension that is more restrictive that the first degree of motion in the first dimension; and a third portion of the magazine engagement structure engageable to interface with the module engagement structure while permitting only a fourth degree of motion in the second dimension that is more restrictive that the second degree of motion in the second dimension.

According to another set of embodiments, a method is provided. The method includes: engaging a first portion of magazine engagement structure of the magazine with module engagement structure of the module in such a way that permits a first degree of motion in a first dimension and a second degree of motion in a second dimension that is different from the first dimension; first slideably engaging the magazine with the module in an installation dimension thereby engaging a second portion of the magazine engagement structure with the module engagement structure to progressively restrict motion of the magazine in the first dimension, the installation dimension being different from the first and second dimensions; and second slideably engaging the magazine with the module in the installation dimension thereby engaging a third portion of the magazine engagement structure with the module engagement structure to progressively restrict motion of the magazine in the second dimension, such that, after second slideably engaging the magazine with the module, the magazine is substantially restricted from moving in the first and second dimensions. In some such embodiments, the method further includes: third slideably engaging the magazine with the module in the installation dimension until a full install position is reached; and securing the magazine from moving in the installation dimension when it is in the full install position, such that, in the full install position, the magazine is substantially restricted from moving in the first, second, and install dimensions.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Figure 1:
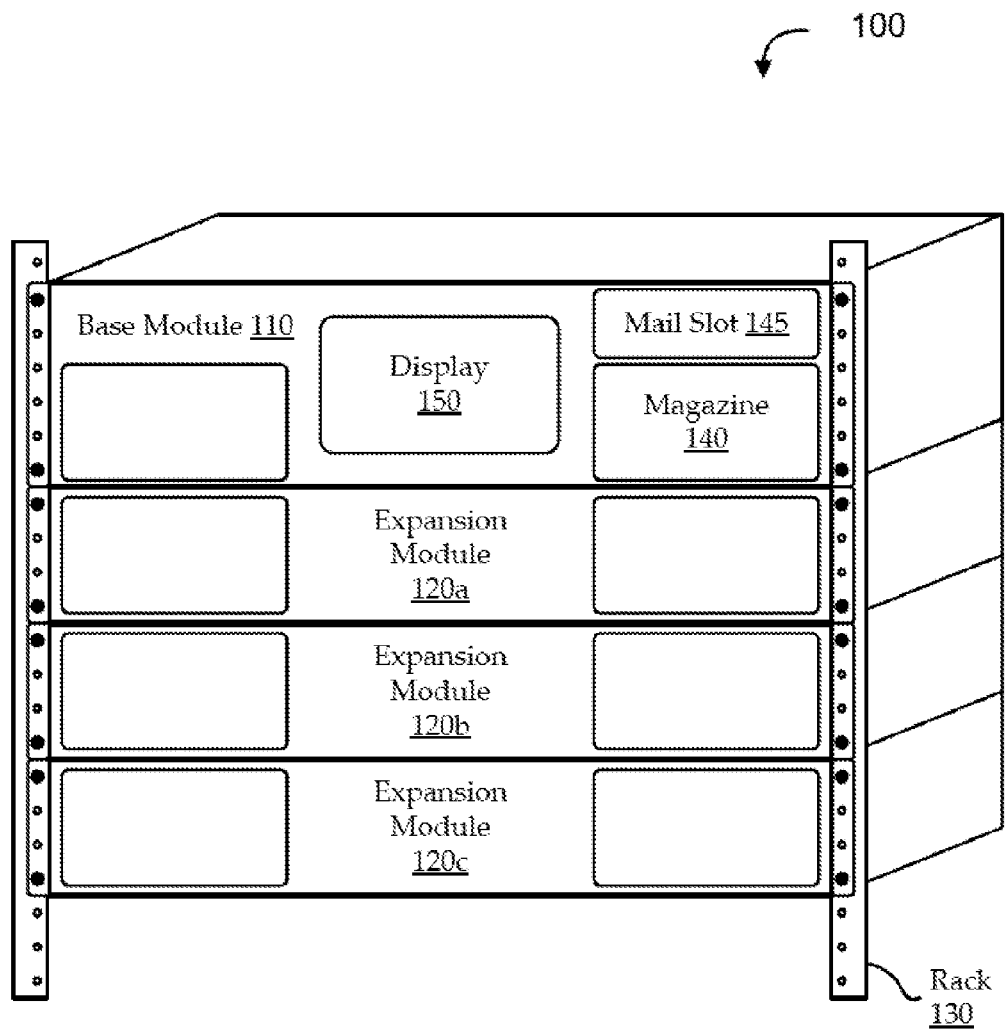
FIG. 1 shows a block diagram of an illustrative rack-mounted storage library, to provide a context for various embodiments.

For the sake of context, FIG. 1 shows a rack-mounted storage library 100 for use with various embodiments. The storage library 100 includes a base module 110 and one or more expansion modules 120, configured to be mounted in an equipment rack 130 (only the mounting rails of the equipment rack 130 are shown for simplicity). The base module 110 and expansion modules 120 provide physical storage for multiple storage media cartridges (e.g., tape cartridges) in magazines 140. Embodiments also include one or more media drives (e.g., tape drives), controllers, power supplies, indicators, communications subsystems, and/or other functions. As will be discussed more fully below, the storage library 100 also includes a robotic mechanism for finding and ferrying storage media cartridges between locations within the storage library 100 (e.g., magazines 140 and drives).

According to an illustrative embodiment, the storage library 100 is a small, rack-mounted, automated tape library. The base module 110 is "3 RU" high (three standard rack units, or approximately 5.25-inch high) and includes one robotic mechanism. Up to nine additional, "2 RU" high (approximately 3.5-inch high) expansion modules 120 can be added to provide additional drive and/or magazine 140 slot capacity, so that a maximum configuration of one base module 110 and nine expansion modules 120 has a total height of "21 RU," or half of a standard equipment rack 130. The single robot mechanism is configured to access all magazine 140 slots and drives in the base module 110 and all expansion modules 120.

In the illustrative embodiment, each of the base module 110 and the expansion modules 120 can house up to two half-height or one full-height LTO5 tape drives. Each of the base module 110 and the expansion modules 120 can also house two removable magazines 140, each having fifteen cartridge slots. In some implementations, the storage library 100 can be divided into partitions each associated with, for example, at least one drive and at least one magazine 140. Each partition can be configured to behave as an independent library, notwithstanding that all partitions share the single robotic mechanism (e.g., partitions can be commanded as independent libraries for tape operations, while sharing many resources for service and administration). Some implementations also include a "mailslot" 145 in the base module 110, as discussed below.

Some embodiments provide local and remote management of various functions through graphical user interfaces (GUI). In one implementation, the local interface GUI is displayed on a seven-inch, front-mounted, touch-screen panel display 150. The remote interface may be implemented as a browser-based interface (BUI), accessible by connecting a web browser to the library's Internet protocol (IP) address.

Some embodiments are configured to be installable and serviceable by end customers to the greatest extent practical. For example, an installation wizard may be provided to simplify initial installation, a simple rack rail system for base modules 110 and expansion modules 120 will allow two people without any mechanical assistance (e.g. lift) to easily install the modules on an equipment rack 130. In some such embodiments, most replaceable library components will be Customer Replaceable Units (CRUs) (i.e., as opposed to field replaceable units (FRUs), which are serviceable and/or replaceable only by trained technicians). For example, certain implementations allow almost all installation, maintenance, upgrades, and/or normal use of the storage library 100 to be performed with only front and rear access to the equipment rack 130 and few or no tools.

Figure 2A:
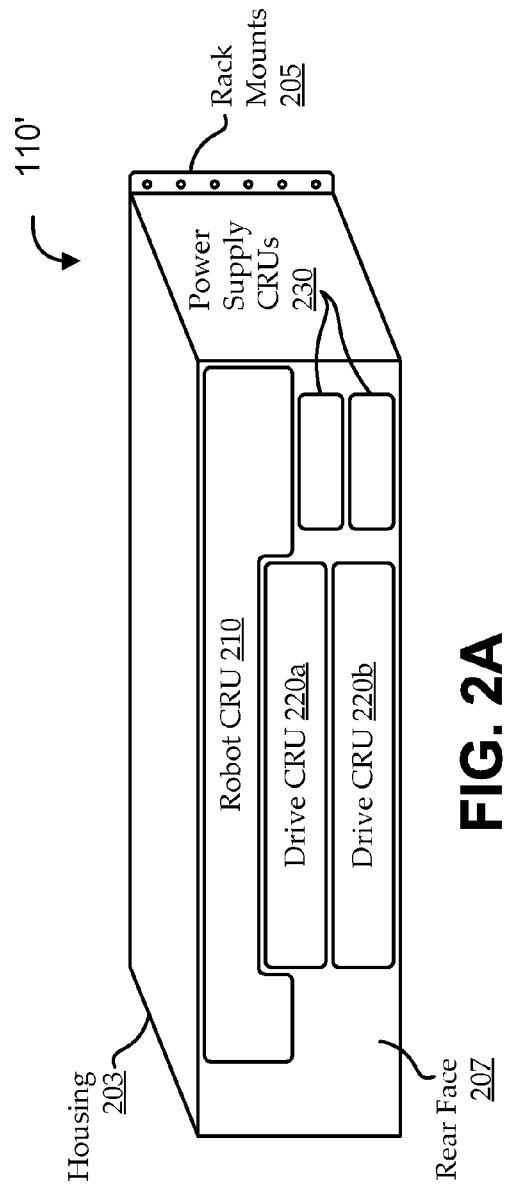
FIGS. 2A and 2B show rear and front views, respectively, of an illustrative base module, according to various embodiments.
Figure 2B:
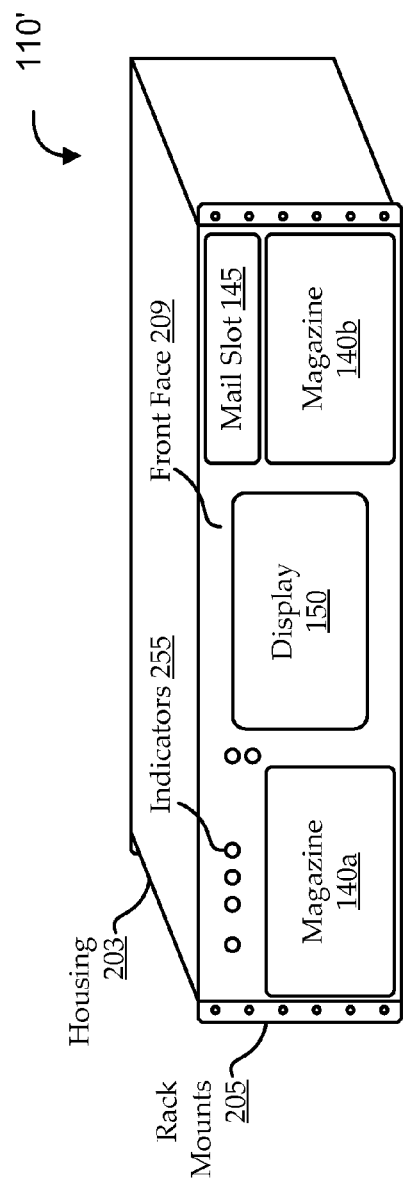

FIGS. 2A and 2B show rear and front views, respectively, of an illustrative base module 110', according to various embodiments. The illustrative base module 110' may be an implementation of base module 110 of FIG. 1. As shown, the base module 110' includes a housing 203 (e.g., a chassis) configured with rack mounts 205 for mounting to an equipment rack (e.g., as shown in FIG. 1). A rear face 207 and a front face 209 are also shown as part of the housing 203. As discussed above, embodiments such as the one illustrated as base module 110', are designed to facilitate customer serviceability. Accordingly, most of the replaceable components are shown as accessible from the front and rear exterior of the base module 110', which would be substantially exposed when mounted in a standard equipment rack.

Looking at the rear view of the base module 110' in FIG. 2A, access is provided to a robot CRU 210, one or more drive CRUs 220, and one or more power supply CRUs 230. As will be described more fully below, the robot CRU 210 is configured to house the robotic mechanism and supporting components (e.g., mechanical drive modules, control hardware and software modules, configuration memory, etc.). Traditional storage library systems typically are configured so that the robotic mechanisms are only serviceable by highly trained personnel, and even removing the mechanism to send out for off-site servicing requires training, specialized tools, or the like. The ability to replace the entire robotic mechanism and all its supporting components in a single CRU is a novel improvement over traditional implementations. For example, implementations allow a customer to simply pop out a broken robot CRU 210 using a couple of thumb screws, slide in a replacement CRU, and reinitialize the system, without waiting for a technician to troubleshoot and fix any issues.

Embodiments of the drive CRUs 220 are media drive modules that can be removed by an end consumer. Various implementations support standard, half-height or full-height tape drives. As described more fully below, the port in the drive for receiving a media cartridge faces into the base module 110', so that media cartridges can only be inserted and/or removed by the robotic mechanism within the confines of the housing 203. In some implementations, one or more "external" media drives may be provided to facilitate troubleshooting and the like.

Embodiments of the power supply CRUs 230 include any useful type of power supply components for supplying power to the base module 110' and or to any other components (e.g., to one or more expansion modules 120 (not shown)). For example, the power supply CRUs 230 can include power generators, power converters, power conditioners, back-up batteries and/or other power duplication, switches, input and/or output ports, indicators, and the like. In some implementations, each power supply CRU 230 includes a male, three-prong connector for interfacing with line power and a main power switch. Some embodiments include a power supply CRU 230 for each drive CRU 220 (i.e., if the base module 110' has only a single drive CRU 220, it may also only have a single power supply CRU 230 to support the drive). In other embodiments, a second power supply CRU 230 is used as a backup supply to the first power supply CRU 230, and may be coupled with a different power source.

In one implementation, the base module 110' has slots for two power supplies (e.g., two power supply CRUs 230). These can be implemented as custom power supplies, for example, having an input voltage of 100-250 volts AC at 50-60 Hertz, and an output voltage of twelve volts DC switched plus five volts DC standby power. For example, the power supplies may be sized to run two tape drives plus robotics and any other sensors, etc. (e.g., with or without redundancy). Typically, the base module 110' has at least one power supply, even if no drives are included, to support the main processor, interface functionality (e.g., the display 150), etc.

Looking at the front view of the base module 110' in FIG. 2B, access is provided to a display 150, one or more magazines 140, and a mailslot 145. One or more indicators 255 may also be provided to show certain operational states, and the like (note that the sizes, numbers, positions, etc. of the indicators shown are intended only to be illustrative). In various implementations, base module 110 has overall library status indicators on the front and back of the module, along with a locate switch which activates the front and back locate LEDs; powered CRUs may have their own status indicators; hot-swappable CRUs can have indicators that show when the CRUs can be safely removed; power supplies and tape drives can have additional indicators; an "AC present" indicator can be provided to stay on even when the storage library is off (as long as AC power is connected). In one embodiment, a set of primary indicators include "locate," "fault," and "OK" indications. Next to the primary indicators are secondary indicators specific for the operator panel that indicate the status of the operator panel (e.g., an operator panel CRU, if implemented as such).

Other types of indications and status can also be provided using the display 150. Embodiments of the display 150 are used to facilitate various functionality through a local graphical user interface (GUI), including, for example, IO functions, service and diagnostic functions, etc. In one implementation, the display 150 is a seven-inch, front-mounted, touch-screen panel (e.g., an LCD touch panel display with a WVGA (wide VGA) 800×480 pixel screen equipped with a resistive or capacitive touch-sensitive overlay).

Each magazine 140 can be configured to hold multiple (e.g., up to fifteen) cartridges in such a way as to be reliably accessed by the robotic mechanism. For example, the magazines 140 can be designed to have features to aid in targeting, location, and or other functions of the robotic mechanism; features that securely hold the cartridges in place, while allowing for easy release of the cartridges to a robotic gripper when desired; features to add strength to the magazines 140 (e.g., to reduce sag, increase usable life, etc.) and/or to reduce weight; etc.

Embodiments of the mailslot 145 (or "Cartridge Access Port" (CAP)) include a special type of magazine designed to act as a controlled interface between the human user and the robotic mechanism. To add or remove cartridges from the storage library, a user ejects the mailslot 145 from the base module 110' and is presented with a number of cartridge slots (e.g., four "Import/Export cells" ("I/E cells")). The user can then insert cartridges into, or remove cartridges from, these slots without interfering with robotic mechanism's operations. In some implementations, the robotic mechanism is used to activate a latch internal to the base module 110, thereby allowing the user to remove the mailslot 145 only when the robotic mechanism is in an appropriate condition (e.g., parked in the robot CRU 210). Certain embodiments having data partitions (as discussed above) only allow one partition at a time to make use of the mailslot 145.

Figure 3A:
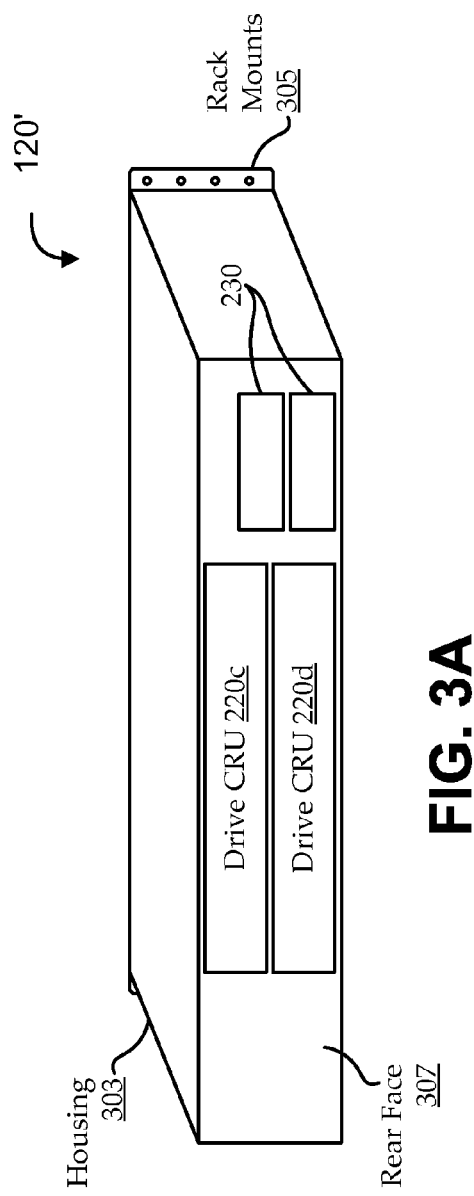
FIGS. 3A and 3B show rear and front views, respectively, of an illustrative expansion module, according to various embodiments.
Figure 3B:
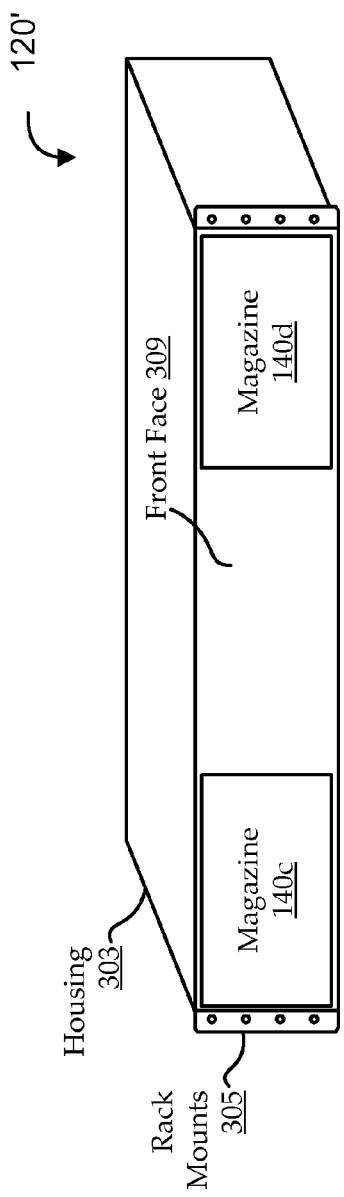

FIGS. 3A and 3B show rear and front views, respectively, of an illustrative expansion module 120', according to various embodiments. The illustrative expansion module 120' may be an implementation of expansion module 120 of FIG. 1. As shown, the expansion module 120' includes a housing 303 (e.g., a chassis) configured with rack mounts 305 for mounting to an equipment rack (e.g., as shown in FIG. 1). A rear face 307 and a front face 309 are also shown as part of the housing 303. As with the base module 110' of FIGS. 2A and 2B, the expansion module 120' is designed to facilitate customer serviceability. Most of the replaceable components are shown as accessible from the front and rear exterior of the expansion module 120', which would be substantially exposed when mounted in a standard equipment rack.

In the embodiment shown, various aspects of the expansion module 120' are similar or identical to the base module 110'. For example, embodiments of the expansion module 120' do not typically have a robot CRU 210, display 150, or mailslot 145, as they are configured to exploit that functionality from the base module 110' components. However, like the base module 110', the expansion module 120' includes one or more drive CRUs 220 and one or more power supply CRUs 230 configured to be accessed from the rear side of the expansion module 120', and one or more magazines 140 configured to be accessed from the front side of the expansion module 120'. In some embodiments, the drive CRUs 220, power supply CRUs 230, and/or magazines 140 of the expansion module 120' are the same as those implemented in the base module 110'.

Because of the lack of certain features in embodiments of the expansion module 120' (e.g., there may be no robot CRU 210, no main processor, etc.), expansion module 120' power requirements may be different from those of the base module 110. In certain implementations, the expansion modules 120' still have slots for two power supplies (e.g., two power supply CRUs 230), which can be implemented as the same power supplies used in the base module 110 (e.g., to avoid having to support or source multiple types of power supplies). However, the power supplies of the base module 110 may provide more power than is needed to run configurations of the expansion modules 120'. For example, a single power supply may be able to support an expansion module 120' even with two drives, and it is possible to implement an expansion module 120' with no drives and no power supplies. Alternatively, two power supplies may still be used, for example, to provide redundancy.

As discussed above, the base module 110' and expansion modules 120' include a number of components that can be designed for customer replaceability, including the robot CRU 210, drive CRUs 220, power supply CRUs 230, and magazines 140. It is worth noting that, even though these components may be accessible and replaceable by customers, embodiments may still be configured to prevent (or mitigate) undesirable interference with those components. As one example, those replaceable components typically are installed in a physically secure manner (e.g., using latches, thumbscrews, removable faceplates, and/or other techniques) to provide relatively easy access when needed, while mitigating inadvertent access (e.g., accidental removal of a magazine 140 during operation). As another example, certain embodiments may allow a drive CRU 220 to be removed during operation of the storage system, so long as the drive is not actively in use (e.g., by using a drive eject or park command, or other technique). As still another example, removal of the robot CRU 210 or magazines 145 may be prevented until certain operations have been completed (e.g., the robotic mechanism is parked within the base module 110', etc.).

Some embodiments described herein provide novel structural features that facilitate relatively simple installation and/or removal of magazines 140 in context of base modules 110 and/or expansion modules 120. There are a number of contexts in which it is desirable to remove and/or install a magazine 140. For example, it may be desirable to fill a magazine 140 with data storage cartridges and to install the full magazine 140 into the data storage system. As discussed above, traditional data storage systems (e.g., non-modular systems) are not typically designed to facilitate customer installation and/or removal of components including magazines 140. For example, traditional magazine 140 installation may involve specialized tooling, coupling with relatively complex drawer railing mechanisms, manipulation and/or coupling with various alignment and/or securement features, etc. Embodiments use staged structural features to sequentially guide and align a magazine 140 into a desired position in a data storage system. The structural features are designed to facilitate relatively simple installation while providing sufficiently accurate and secure positioning.

Figure 4:
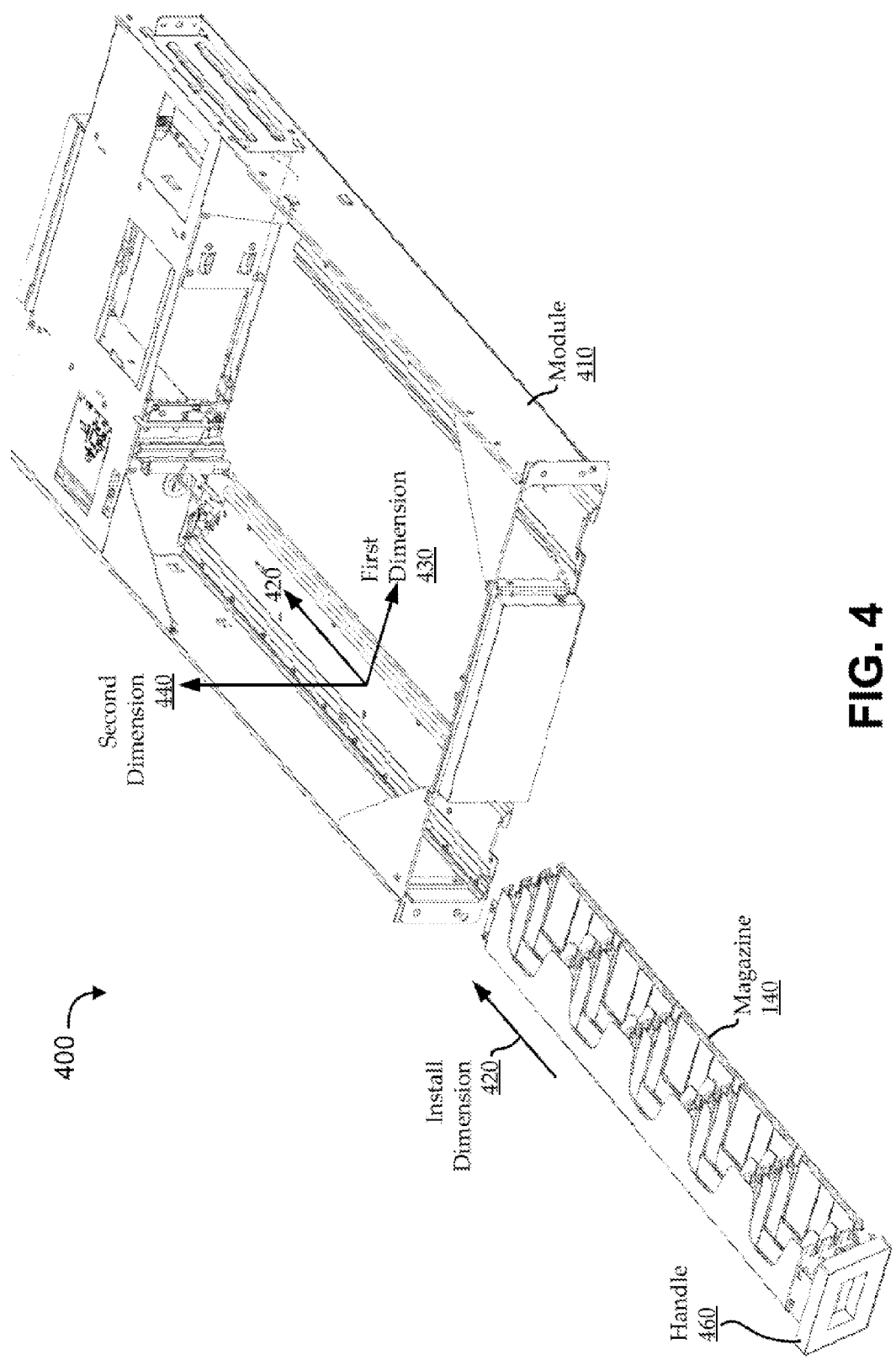
FIG. 4 shows an illustrative installation environment that includes a module and a magazine configured to be installed in the module, according to various embodiments.

Turning to FIG. 4, an illustrative installation environment 400 is shown that includes a module 410 and a magazine 140 configured to be installed in the module 410, according to various embodiments. The module 410 may be a base module 110, an expansion module 120, or the like. The module 410 is shown removed from the context of a larger data storage system for the sake of clarity. The module 410 may include one or more installation locations for receiving a magazine 140. For example, the module 410 illustrated is configured to receive to magazines 140.

To provide reference, various dimensions are defined in context of the module 410. The magazine 140 is configured to be installed in the module 410 in an install dimension 420. A first dimension 430 and a second dimension 440 are also defined in relation to the install dimension 420. In some embodiments, the first dimension 430, the second dimension 440, and the install dimension 420 are all orthogonal to each other. For example, with reference to dimensions discussed above, the install dimension 420 may run substantially in the X direction, and the second dimension 440 may run substantially in the Z direction. It will be appreciated that the first dimension 430 and second dimension 440 can run in directions other than those illustrated and may or may not be orthogonal to each other and/or to the install dimension 420. Accordingly, to the various dimensions herein are intended only for the sake of adding clarity and should not be construed to limit the scope of embodiments.

Embodiments include installation structure on the magazine 140 and/or on the module 410 that facilitates relatively easy installation and/or removal of the magazine 140. In some embodiments, the installation structure is positionally staged to successively restrict motion of the magazine relative to the module as the magazine is installed in the install dimension 420. For example, the magazine 140 is slidably engageable with the module 410 in such a way that, at a first stage of installation, the magazine 140 has relatively unrestricted motion in context of the module 410; and that motion becomes increasingly restricted as the magazine 140 is further slidably engaged into the module 410.

Figure 5:
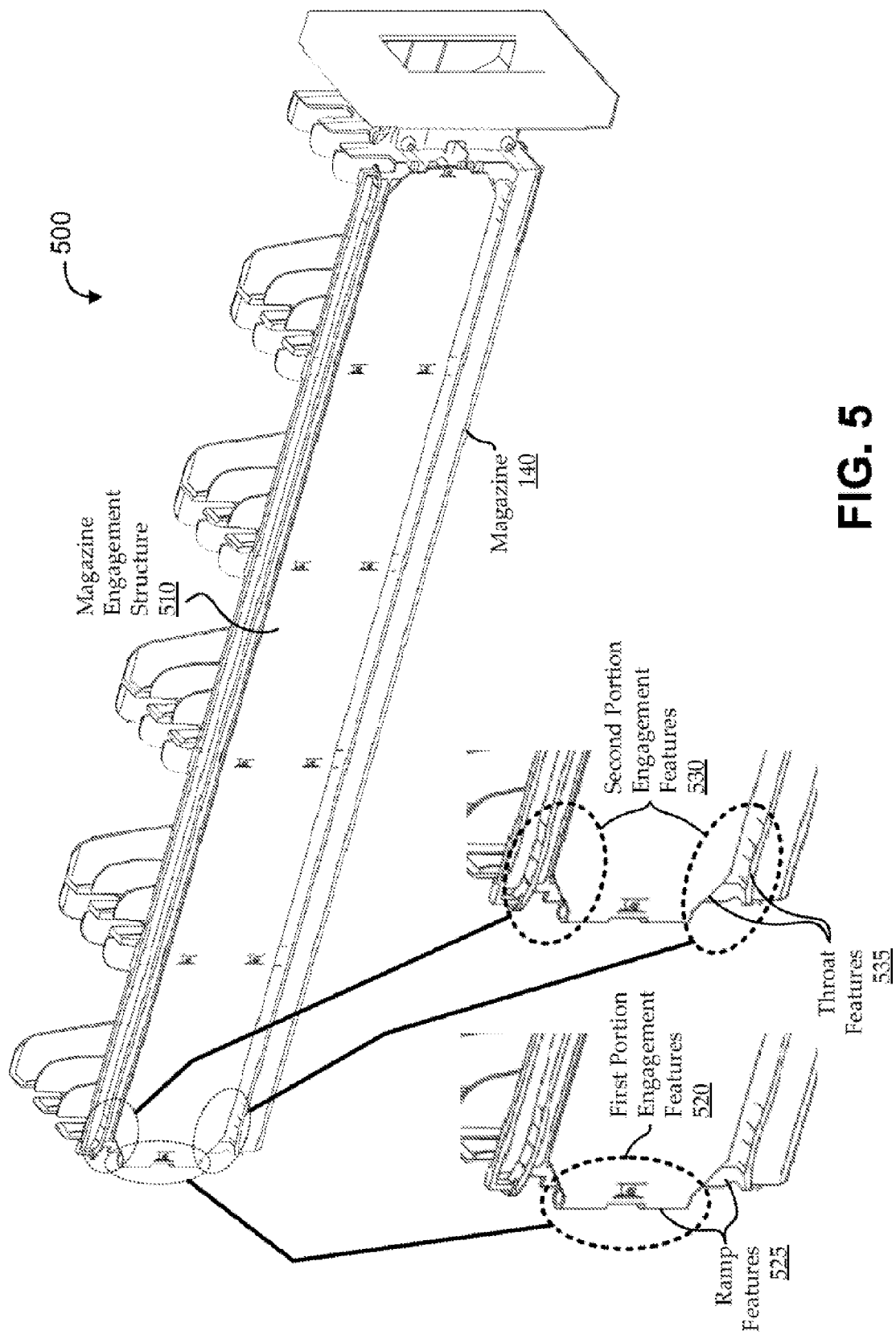
FIG. 5 shows an illustrative magazine having structural features for facilitating relatively simple installation of the magazine into a module, according to various embodiments.
Figure 6:
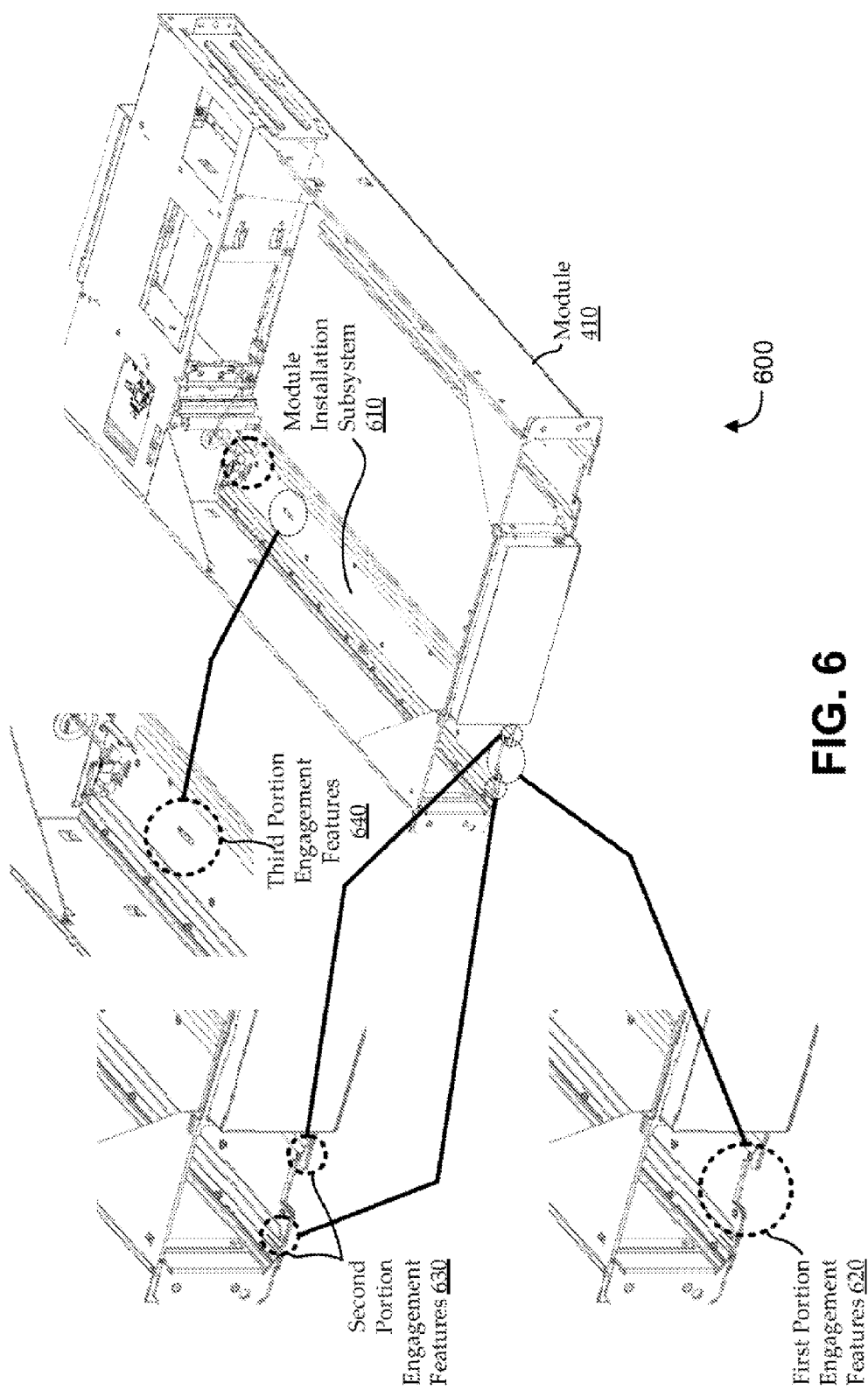
FIG. 6 shows an illustrative module having structural features for facilitating relatively simple installation of magazines, like the magazine of FIG. 5, according to various embodiments.

FIG. 5 shows an illustrative magazine 140 having structural features for facilitating relatively simple installation of the magazine 140 into a module 410, according to various embodiments. FIG. 6 shows an illustrative module 410 having structural features for facilitating relatively simple installation of magazines 140, like the magazine 140 of FIG. 5, according to various embodiments. As discussed above, the magazine 140 in the module 410 include coordinating engagement structures to facilitate relatively easy engagement during installation. Accordingly, for added clarity, FIGS. 5 and 6 will be described concurrently.

As illustrated, the magazine 140 includes magazine engagement structure 510, and the module 410 includes module engagement structure 610. For example, the magazine engagement structure 510 may be a formed element or elements integral with or coupled with the base magazine 140 structure, and the module engagement structure 610 may be a formed element or elements integral with were coupled with the base module 410 structure. In some embodiments, some or all of the magazine engagement structure 510 and/or the module engagement structure 610 is manufactured from sheet metal to have various engagement features. According to some embodiments, engagement of the magazine 140 with the module 410 is positionally staged by locating features so that those features engage with other, coordinating features at particular installation positions.

According to the illustrated magazine engagement structure 510 and module engagement structure 610, positionally staged features effectively provide three installation stages. At a first installation stage, first portion engagement features 520 of the module engagement structure 510 are configured to engage with first portion engagement features 620 of the module 410. At this first installation stage, the engagement features are configured to provide a relatively loose initial engagement, so that the magazine 140 is able to move in multiple dimensions (e.g., at least the first dimension 430 in the second dimension 440) to a relatively unrestricted degree. For example, the first portion engagement features are configured to allow the magazine 142 float within relatively large extents in at least two dimensions other than the install dimension 420.

In some embodiments, the first portion engagement features 520 of the magazine 140 include one or more ramp features 525. In one embodiment, the ramp features 525 include a sloping portion of the base structure of the magazine 140 and/or a coordinatingly sloping (e.g., sloping in the opposite direction) portion of the magazine engagement structure 510. As illustrated, the magazine engagement structure 510 can be folded over at its end to effectively eliminate a sharp first contact edge. The first portion engagement features 620 of the module 410 are configured to coordinate with the first portion engagement features 520 of the magazine 140. As illustrated, the first portion engagement features 620 of the module 410 include a cutaway portion of the module engagement structure 610. The cutaway is positioned, sized, and shaped to receive the ramp feature 525 of the magazine engagement structure 510; and the portions of the module engagement structure 610 on either side of the cutaway are configured to receive the ramp features 525 of the base structure of the magazine 140. According to this configuration, the cutaway feature of the module engagement structure 610 effectively encourages the magazine engagement structure 510 into an initial (i.e., first stage) engagement position.

Once the magazine 140 is in its initial engagement position with respect to the module 410, the magazine engagement structure 510 can slidably engage with the module engagement structure 610. As illustrated, slidably engaging the magazine engagement structure 510 with the module engagement structure 610 in the install direction 420 causes second portion engagement features 530 of the magazine 140 to engage with coordinating second portion engagement features 630 of the module 410. In some embodiments, the second portion engagement features 530 of the magazine engagement structure 510 include throat features 535. The throat features 535 are configured to relatively smoothly guide the magazine engagement structure 510 into engagement with the module engagement structure 610. For example, as the magazine engagement structure 510 slides in the install direction 420 with respect to the module engagement structure 610, guide elements of the second portion engagement features 630 of the module 410 are effectively funneled into a desired alignment via the throat features 535.

In this way, the throat features 535 progressively restrict movement of the magazine 140 with respect to the module 410 in at least one dimension as the magazine 140 continues to be moved in the install dimension 420. For example, in the initial engagement position, the magazine 140 is substantially free to move in both the first dimension 430 in the second dimension 440. However, movement of the magazine 140 in the first dimension 430 is substantially restricted by slidably engaging the magazine 140 into a second installation stage in which the second portion engagement features 530 of the magazine 140 are engaged with the second portion engagement features 630 of the module 410. Accordingly, in the second installation stage, the magazine 140 has a relatively secure alignment in the first dimension 430 while continuing to have less restricted motion in the second dimension 440 (e.g., and in the install dimension 420).

In some embodiments, the magazine engagement structure 510 of the magazine 140 and/or the module engagement structure 610 of the module 410 include third portion engagement features. In the illustrated implementation, only the module engagement structure 610 includes third portion engagement features 640 (i.e., the third portion engagement features 640 of the module 410 are configured to engage generally with the magazine engagement structure 510). As shown, the third portion engagement features 640 of the module 410 can include a ramp or bump feature in the module engagement structure 610. As the magazine 140 continues to be slidably engaged with the module 410 in the install dimension 420, the magazine engagement structure 510 eventually reaches the third portion engagement features 640 of the module engagement structure 610. The third portion engagement features 640 effectively bias the module engagement structure 510 to one extent of a range of allowed motion in the second dimension 440.

In this way, the degree of motion permitted to the magazine 140 in the second dimension 440 is progressively restricted as the magazine 140 continues to slidably engage in the install dimension 420 with the module 410. For example, in the initial engagement position, the magazine 140 is permitted to move within relatively large extents in both the first dimension 430 and the second dimension 440. As the magazine 140 is slidably engaged with the module 410 in the install dimension 420, the second installation stage is reached, in which the magazine 140 is permitted to move only within relatively small extents in the first dimension 430 while continuing to be permitted to move within relatively large extents in the second dimension 440. When the magazine 140 is further slidably engaged with the module 410 in the install dimension 420, a third installation stage is reached, in which the magazine 140 is permitted to move only within relatively small extents in the second dimension 440. Accordingly, when the magazine 140 is in the third installation stage, the magazine 140 is in a relatively secure alignment with relatively restricted motion in both the first dimension 430 and the second dimension 440.

Figure 7B:
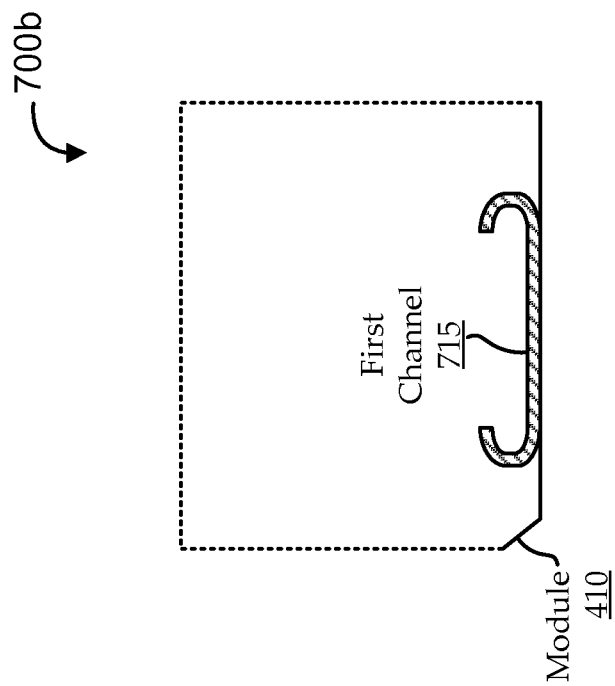
FIGS. 7A and 7B show simplified cross-sectional views of a magazine and a module, respectively, according to various embodiments.
Figure 7A:
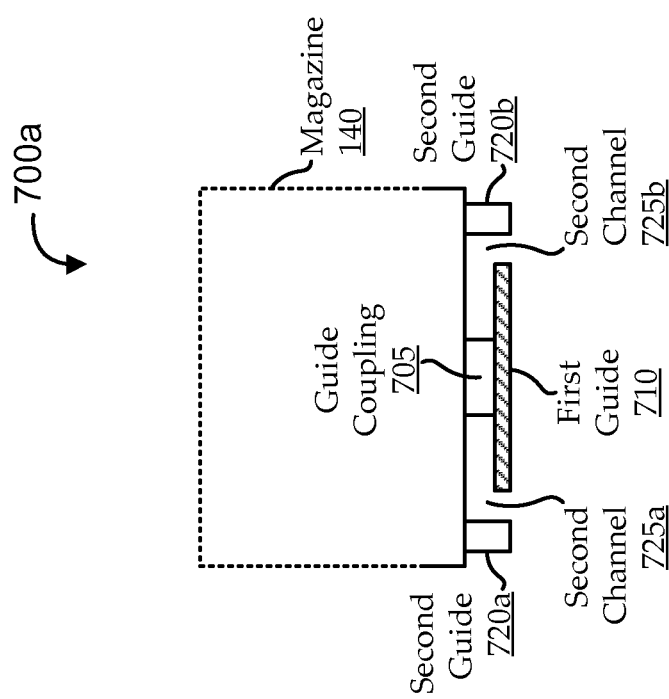

For the sake of adding clarity, FIGS. 7A and 7B show simplified cross-sectional views 700 of a magazine 140 and a module 410, respectively, according to various embodiments. As illustrated, the magazine 140 includes a first guide 710 coupled with the base magazine 140 structure via a guide coupling 705. A bottom face of the magazine 140 base structure, the guide coupling 705, and the first guide 710, manifest a substantially "I"-shaped cross-section. In some embodiments, the magazine 140 also includes second guides 720 disposed on either side of the first guide 710. The second guides 720 may be integrated with the base magazine 140 structure.

Though the first guide 710 and the second guides 720 are simplistically shown as having a constant cross-section, it will be appreciated that the cross-section may change over the span of the magazine engagement structure 510. For example, a front edge of the first guide 710 may be rounded over to form a ramp feature, like the ramp feature 525 of the first portion engagement features 520 described with reference to FIG. 5. Further, one or more bevels or other features may be included proximate to the front edge of the first guide 710 to form through features, like the throat features 535 of the second portion engagement features 530 described with reference to FIG. 5. Similarly, the second guide 720 may be shaped (e.g., molded) to form corresponding throat features 535. As illustrated, regions between the second guide 720 in the first guide 710 effectively form a second channel 725 (e.g., or two second channels 725).

Embodiments of the module 410 include structure shaped to form a first channel 715. As illustrated, the first channel 715 may generally have a "C"-shaped cross-section. The first channel 715 may be configured to slidably engage with the second channel 725 formed by elements of the magazine 140. Characteristics of the first channel 715 and the second channel 725 can effectively define extents of motion for the magazine 140 with respect to the module 410.

For example, in a first installation position, the first channel 715 is not fully engaged with the second channel 725, so that motion of the magazine 140 is substantially unrestricted by the initial (partial) engagement. In a second installation position, the first channel 715 is fully engaged with the second channel 725, and the first guide 710 and second guide 720 are shaped (e.g., to form a throat feature) to progressively restrict movement in at least one dimension. For example, one or more features biases the first guide 710 and/or the second guide 720 horizontally against the first channel 715. In a third installation position, the first channel 715 continues to be fully engaged with the second channel 725 and one or more features are configured to bias the first guide 710 and/or the second guide 720 both horizontally and vertically against the first channel 715. In this way, the magazine 140 becomes securely aligned with respect to the first channel 715, and, accordingly, with respect to the module 410.

It will be appreciated that the embodiments shown in FIGS. 4-7B provide only a subset of many possible embodiments for performing the novel functionality described herein. A number of modifications to the magazine engagement structure, the module engagement structure, and/or their component features are possible while still providing similar or identical engagement functionality. Accordingly, the specific embodiments described above are intended only to provide illustrative embodiments and should not be construed as limiting the scope of additional and/or alternative embodiments. Further, the embodiments described above and/or additional or alternative embodiments can be used to perform a number of different functions, including method embodiments described with reference to FIG. 8 below.

Figure 8:
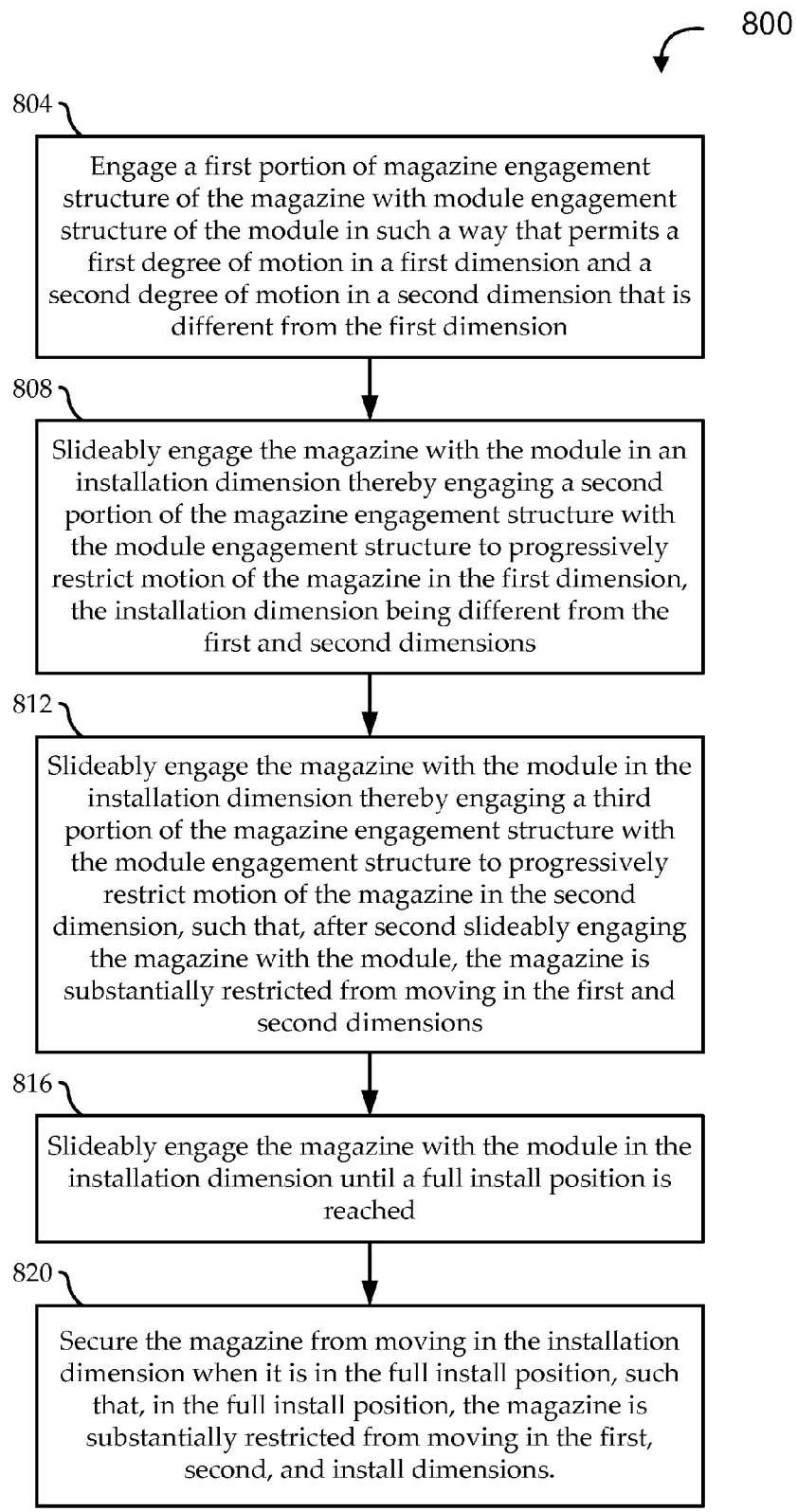
FIG. 8 shows a flow diagram of an illustrative method for performing engagement functionality, according to various embodiments.

FIG. 8 shows a flow diagram of an illustrative method 800 for performing engagement functionality, according to various embodiments. Embodiments of the method 800 began at stage 804 by engaging a first portion of magazine engagement structure of a magazine with module engagement structure of a module in such a way that permits a first degree of motion in a first dimension and a second-degree of motion in a second dimension that is different from the first dimension. For example, the engagement at stage 804 is a partial engagement between the magazine and the module configured to allow the magazine to move at least within relatively large extents in at least two dimensions other than an install dimension. In one embodiment, the first portion of magazine engagement structure is engaged by setting a ramp feature of the magazine engagement structure into place with a receiving feature (e.g., a cutaway feature) of the module engagement structure in such a way that supports at least one end of the magazine while permitting the first degree of motion in the first dimension and the second degree of motion in the second dimension. In some embodiments, the first dimension, the second dimension, and the install dimension are orthogonal to each other.

At stage 808, the magazine can be slidably engaged with the module in the install dimension, thereby engaging a second portion of the magazine engagement structure with the module engagement structure. In some embodiments, one of the module engagement structure or the magazine engagement structure includes a channel, and the other of the module engagement structure or the magazine engagement structure includes a guide feature that is slideably engagable with the channel. The slidable engagement at stage 808 progressively restricts motion of the magazine in the first dimension. For example, as the magazine is slid into the module in the install dimension, structural throat features (e.g., of the magazine engagement structure and/or the module engagement structure) progressively restrict movement (e.g., horizontal movement) of the magazine with respect to the module.

At stage 812 the magazine is further slidably engaged with the module in the install dimension, thereby engaging a third portion of the magazine engagement structure with the module engagement structure. The slidable engagement at stage 812 progressively restricts motion of the magazine in the second dimension. For example, as the magazine is slid further into the module in the install dimension, additional structural features (e.g., throat features, ramp features, bump features, etc.) progressively restrict movement (e.g., vertical movement) of the magazine with respect to the module. In certain embodiments, one of the magazine engagement structure or the module engagement structure includes a ramp feature that engages biases the other of the magazine engagement structure or the module engagement structure into a particular position. After slidably engaging the second and third portions of the magazine engagement structure with the module engagement structure, the magazine is substantially restricted from moving in both the first and second dimensions with respect to the module.

In some embodiments, at stage 816, the magazine is further slidably engaged with the module in the install dimension until a full install position is reached. For example, the magazine is slid further into the module in the install dimension until it is fully installed (e.g., pushed all the way in). At stage 820, the magazine may be secured in the full install position, thereby substantially restricting further movement in the install dimension. For example, thumbscrews, latches, and/or any other kind of securing feature is used to secure the magazine to the module to restrict undesired movement in the install dimension. Having secured the magazine in the full install position at stage 820, the magazine is substantially restricted from moving in all of the first, second, and install dimensions. In one implementation, a ratcheting latch mechanism is used to secure the magazine in one of a range of valid "full install" positions. For example, the ratcheting mechanism can be used to effectively latch the magazine in place, even accounting for manufacturing and/or other tolerances.

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims.

The various operations of methods and functions of certain system components described above may be performed by any suitable means capable of performing the corresponding functions. The means may include various hardware and/or software component(s) and/or module(s), including, but not limited to a circuit, an application specific integrated circuit (ASIC), or processor. For example, logical blocks, modules, and circuits described may be implemented or performed with a general purpose processor, a digital signal processor (DSP), an ASIC, a field programmable gate array signal (FPGA), or other programmable logic device (PLD), discrete gate, or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm or other functionality described in connection with the present disclosure, may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media. Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material. Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A storage system comprising:
a magazine configured to hold cartridges in a plurality of slots and to be installed in a module by slideably engaging magazine engagement structure of the magazine with module engagement structure of the module in an installation dimension, the magazine engagement structure comprising:
a first portion of the magazine engagement structure engageable to interface with the module engagement structure while permitting a first degree of motion in a first dimension and a second degree of motion in a second dimension, wherein the first dimension, the second dimension, and the installation dimension are different dimensions;
a second portion of the magazine engagement structure engageable to interface with the module engagement structure while permitting only a third degree of motion in the first dimension that is more restrictive than the first degree of motion in the first dimension; and
a third portion of the magazine engagement structure engageable to interface with the module engagement structure while permitting only a fourth degree of motion in the second dimension that is more restrictive than the second degree of motion in the second dimension,
wherein the magazine is configured to be installed in the module by:
engaging the first portion of the magazine engagement structure to interface with the module engagement structure; and
after engaging the first portion, slideably engaging the second and third portions of the magazine engagement structure with the module engagement structure in the installation dimension.

2. The storage system of claim 1, wherein the first portion of the magazine engagement structure comprises a ramp feature configured to engage with a receiving feature of the module engagement structure in such a way that supports at least one end of the magazine while permitting the first degree of motion in the first dimension and the second degree of motion in the second dimension.

3. The storage system of claim 1, wherein the second portion of the magazine engagement structure comprises a throat feature configured to interface with the module engagement structure in such a way that progressively restricts motion of the magazine in the first dimension with respect to the module as the magazine engagement structure is slideably engaged with the module engagement structure in the installation dimension.

4. The storage system of claim 1, wherein:
the module engagement structure comprises a first channel; and
the magazine engagement structure comprises a first guide feature that is slideably engagable with the first channel.

5. The storage system of claim 4, wherein:
the first channel is a "C" channel; and
the first guide feature forms an "I" cross-section with a bottom side of the magazine that is slideably engagable with the "C" channel.

6. The storage system of claim 4, wherein:
the magazine engagement structure comprises a second guide feature that runs adjacent to the first guide feature to form a second channel there-between; and
the second portion of the magazine engagement structure comprises a throat feature formed by a progressive narrowing of the second channel in such a way that progressively restricts motion of the magazine in the first dimension from the first degree of motion to the third degree of motion with respect to the module as the magazine engagement structure is slideably engaged with the module engagement structure in the installation dimension.

7. The storage system of claim 4, wherein:
the magazine engagement structure comprises a second guide feature that runs adjacent to a first side of the first guide feature to form a first movement extent in the first dimension;
the magazine engagement structure comprises a third guide feature that runs adjacent to a second side of the first guide feature to form a second movement extent in the first dimension; and
the second portion of the magazine engagement structure comprises a throat feature formed by a progressive narrowing of a distance between the first movement extent and the second movement extent in such a way that progressively restricts motion of the magazine in the first dimension from the first degree of motion to the third degree of motion with respect to the module as the magazine engagement structure is slideably engaged with the module engagement structure in the installation dimension.

8. The storage system of claim 4, wherein the third portion of the magazine engagement structure comprises a ramp feature configured to interface with the module engagement structure in such a way that progressively restricts motion of the magazine in the second dimension with respect to the module as the magazine engagement structure is slideably engaged with the module engagement structure in the installation dimension.

9. The storage system of claim 4, wherein the third portion of the magazine engagement structure comprises a region of the first guide feature that is configured to interface with a ramp feature of the module engagement structure in such a way that progressively restricts motion of the magazine in the second dimension with respect to the module as the magazine engagement structure is slideably engaged with the module engagement structure in the installation dimension.

10. The storage system of claim 1, further comprising a plurality of modules, wherein the module is one of the plurality of modules each comprising module engagement structure, the magazine is one of a plurality of magazines each comprising respective magazine engagement structure, and the respective magazine engagement structure of each magazine is slidably engageable with at least one respective module engagement structure of at least one module.

11. The storage system of claim 1, wherein the first dimension, the second dimension, and the installation dimension are substantially orthogonal to each other.

12. A method for staged installation of a magazine in a storage system module, the method comprising:
- engaging a first portion of magazine engagement structure of the magazine with module engagement structure of the module in such a way that permits a first degree of motion in a first dimension and a second degree of motion in a second dimension that is different from the first dimension, the magazine configured to hold cartridges in a plurality of slots;
- first slideably engaging the magazine with the module in an installation dimension thereby slideably engaging a second portion of the magazine engagement structure with the module engagement structure to progressively restrict motion of the magazine in the first dimension from the first degree of motion to a third degree of motion, the installation dimension being different from the first and second dimensions; and
- after first slideably engaging the magazine with the module, second slideably engaging the magazine with the module in the installation dimension thereby slideably engaging a third portion of the magazine engagement structure with the module engagement structure to progressively restrict motion of the magazine in the second dimension from the second degree of motion to a fourth degree of motion,
- such that, after second slideably engaging the magazine with the module, the magazine is substantially restricted from moving in the first and second dimensions.

13. The method of claim 12, further comprising:
- third slideably engaging the magazine with the module in the installation dimension until a full install position is reached; and
- securing the magazine from moving in the installation dimension when it is in the full install position, such that, in the full install position, the magazine is substantially restricted from moving in the first, second, and install dimensions.

14. The method of claim 12, wherein engaging the first portion of magazine engagement structure comprises engaging a ramp feature of the magazine engagement structure with a receiving feature of the module engagement structure in such a way that supports at least one end of the magazine while permitting the first degree of motion in the first dimension and the second degree of motion in the second dimension.

15. The method of claim 12, wherein the first slideably engaging step comprises slideably engaging a throat feature of the magazine engagement structure with the module engagement structure in such a way that progressively restricts motion of the magazine in the first dimension with respect to the module.

16. The method of claim 12, wherein the first slideably engaging step comprises slideably engaging a guide feature of the magazine engagement structure with a throat feature of the module engagement structure in such a way that progressively restricts motion of the magazine in the first dimension with respect to the module.

17. The method of claim 12, wherein:
- one of the module engagement structure or the magazine engagement structure comprises a channel; and
- the other of the module engagement structure or the magazine engagement structure comprises a guide feature that is slideably engagable with the channel.

18. The method of claim 12, wherein the second slideably engaging step comprises slideably engaging a guide feature of the magazine engagement structure with a ramp feature of the module engagement structure in such a way that progressively restricts motion of the magazine in the second dimension with respect to the module.

19. The method of claim 12, wherein the second slideably engaging step comprises slideably engaging a ramp feature of the magazine engagement structure with a guide feature of the module engagement structure in such a way that progressively restricts motion of the magazine in the second dimension with respect to the module.

20. A method for staged installation of a magazine in a storage system module, the method comprising:
- engaging a first ramp feature of a magazine engagement structure with a first receiving feature of a module engagement structure in such a way that supports at least one end of the magazine while permitting a first degree of motion in a first dimension and a second degree of motion in a second dimension that is different from the first dimension, the magazine configured to hold cartridges in a plurality of slots;
- slideably engaging, in an installation dimension, a second ramp feature of one of the magazine engagement structure or the module engagement structure with a second receiving feature of the other of the magazine engagement structure or the module engagement structure in such a way that progressively restricts motion of the magazine in the first dimension with respect to the module from the first degree of motion to a third degree of motion, the installation dimension being different from the first and second dimensions; and
- slideably engaging, in the installation dimension after slideably engaging the second ramp feature, a third ramp feature of one of the magazine engagement structure or the module engagement structure with a third receiving feature of the other of the magazine engagement structure or the module engagement structure in such a way that progressively restricts motion of the magazine in the second dimension with respect to the module from the second degree of motion to a fourth degree of motion,
- such that, after slideably engaging the third ramp feature, the magazine is substantially restricted from moving in the first and second dimensions.

* * * * *

UNITED STATES PATENT AND TRADEMARK OFFICE
CERTIFICATE OF CORRECTION

PATENT NO.        : 8,749,913 B2
APPLICATION NO.   : 13/473373
DATED             : June 10, 2014
INVENTOR(S)       : Plutt et al.

It is certified that error appears in the above-identified patent and that said Letters Patent is hereby corrected as shown below:

In the Specification

Column 1, line 22, delete "(IO)" and insert -- (I/O) --, therefor.

Column 4, line 48, delete "and or" and insert -- and/or --, therefor.

Column 5, line 31, delete "IO" and insert -- I/O --, therefor.

Column 5, line 41, delete "and or" and insert -- and/or --, therefor.

Signed and Sealed this
Third Day of February, 2015

Michelle K. Lee
*Deputy Director of the United States Patent and Trademark Office*